United States Patent
Schramm

(10) Patent No.: US 6,899,275 B2
(45) Date of Patent: May 31, 2005

(54) MULTIPLE LAYER IDENTIFICATION LABEL USING STACKED IDENTIFICATION SYMBOLS

(75) Inventor: Harry F. Schramm, Winchester, TN (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 227 days.

(21) Appl. No.: 09/837,744

(22) Filed: Apr. 18, 2001

(65) Prior Publication Data

US 2002/0153423 A1 Oct. 24, 2002

(51) Int. Cl.⁷ .............................................. G06K 19/00
(52) U.S. Cl. ...................................................... 235/487
(58) Field of Search ................................ 235/449, 451, 235/487, 468, 375; 283/74, 81, 82

(56) References Cited

U.S. PATENT DOCUMENTS

| | | | | |
|---|---|---|---|---|
| 4,119,361 A | * | 10/1978 | Greenaway | 283/88 |
| 4,880,964 A | * | 11/1989 | Donahue | 235/488 |
| 4,939,757 A | * | 7/1990 | Nambu | 378/8 |
| 5,168,477 A | * | 12/1992 | Schenato et al. | 367/87 |
| 5,283,422 A | * | 2/1994 | Storch et al. | 235/375 |
| 5,540,301 A | * | 7/1996 | Dumont | 186/61 |
| 5,929,415 A | * | 7/1999 | Berson | 235/382 |
| 6,119,943 A | * | 9/2000 | Christy | 235/468 |
| 6,372,293 B1 | * | 4/2002 | Mathus et al. | 427/271 |
| 6,491,221 B1 | * | 12/2002 | Arnold et al. | 235/449 |

* cited by examiner

Primary Examiner—Thien M. Le
Assistant Examiner—Lisa M. Caputo
(74) Attorney, Agent, or Firm—James J. McGroary; Ross F. Hunt, Jr.

(57) ABSTRACT

An automatic identification system and method are provided which employ a machine readable multiple layer label. The label has a plurality of machine readable marking layers stacked one upon another. Each of the marking layers encodes an identification symbol detectable using one or more sensing technologies. The various marking layers may comprise the same marking material or each marking layer may comprise a different medium having characteristics detectable by a different sensing technology. These sensing technologies include x-ray, radar, capacitance, thermal, magnetic and ultrasonic. A complete symbol may be encoded within each marking layer or a symbol may be segmented into fragments which are then divided within a single marking layer or encoded across multiple marking layers.

30 Claims, 7 Drawing Sheets

MULTIPLE LAYER IDENTIFICATION LABEL USING STACKED IDENTIFICATION SYMBOLS

STATEMENT REGARDING FEDERALLY SPONSORED RESEARCH

The invention was made by an employee of the United States Government and may be manufactured and used by or for the Government for governmental purposes without the payment of any royalties.

BACKGROUND OF THE INVENTION

1. Field of the Invention

The present invention relates to an identification method and system which employ a multiple layer machine readable identification label as well as to the label itself, and in particular, to an identification method and system which employ a multiple layer machine readable label having multiple marking layers each encoding a respective identification symbol readable using one or a plurality of sensing technologies to detect the symbol encoded therein.

2. Background of the Invention

Private industries and government agencies such as automotive, communication, distribution, manufacturing, medical/dental, nuclear, pharmaceutical, printing/publishing, security, aerospace/aviation, and defense have a need to apply markings (e.g., labels) to products for esthetic and security reasons.

Conventional labels use single layer identification symbols such as a UPC barcodes (one-dimensional symbols) and more recently two-dimensional symbols (e.g. two-dimensional symbols named by the automated identification and data collection (AIDC) industry). Two-dimensional symbols may be matrix or stacked barcodes that form an encoded array. U.S. Pat. Nos. 4,939,354 and 5,053,609 to Priddy et al. disclose a matrix code (Data Matrix Symbol) designed as a label to be applied directly to products. This matrix code can store from one to 2335 alphanumeric characters in any language.

FIG. 1 illustrates the basic elements of a matrix symbol known in the art. Although shown as a square, matrix symbols may be of any shape. However, square and rectangular shapes are most commonly used in the industry. The unshaded squares comprising the matrix shown in FIG. 1 each represent a binary "0" and the shaded squares each represent a binary "1". FIG. 2 illustrates an example of a data matrix symbol as it would appear on a product to be marked.

In specialized circumstances, it is advantageous to have the label be invisible (i.e., not viewable to the naked eye). Currently, this may be accomplished using inks that when applied to a visible surface, are invisible to the unaided eye. These inks are produced by adding special materials to a carrier ink. Using an appropriate sensor, the marking can be detected.

One disadvantage with current invisible ink materials is that these materials degrade over time. For example, these materials are adversely affected by sunlight.

A second disadvantage with current identification markings is that they are adapted to be optically detected. Consequently, these markings cannot be read if covered by an opaque layer such as paint. Further, only a single layer identification symbol can be used as a label to identify a product because only a single (i.e., top) layer is detectable.

BRIEF SUMMARY OF THE INVENTION

In accordance with the present invention, a method and system are provided which use a multiple layer machine readable identification label. The multiple layer label comprises a plurality of marking layers. Each marking layer encodes a respective identification symbol. The marking layers are stacked on top of one another. All of the identification symbols are read from the various marking layers using either a single or multiple sensors. Such sensors include, but are not limited to, x-ray, radar, capacitance, thermal, magnetic, and ultrasonic sensors.

The invention, in one form thereof, concerns a machine readable multiple layer label to be read by a sensor. The label comprises a plurality of machine readable marking layers stacked one upon another. Each of the marking layers encodes an identification symbol detectable using the sensor. In one specific further embodiment, all of the marking layers are composed of the same medium. The various identification symbols encoded in the marking layers are detected using a single sensor which has tomographic capabilities for discriminating between the marking layers, thereby reading the symbols encoded on the various marking layers. In an alternative embodiment, the various marking layers are composed of different medium each having characteristics detected by a respective, different sensor or sensing technology.

The invention, in another form thereof, relates to a method of forming a multiple layer machine readable identification label. The method comprises applying a marking medium to a substrate layer to form a marking layer encoding a machine readable identification symbol therein. The marking medium has a detecting value that differs from the detecting value of the substrate layer. A neutral layer is applied over the marking layer for spacing. Additional marking layers and neutral layers are applied alternately until the desired number of marking layers are formed. The most recently applied neutral layer acts as the substrate layer for the successive marking layer.

The invention, in yet another embodiment thereof, concerns an automatic identification system comprising a plurality of machine readable marking layers stacked one upon another. Each of the marking layers encodes a respective identification symbol. A sensor detects the respective identification symbol from each of the marking layers. In alternative embodiments, the plurality of machine readable marking layers may comprise the same or a different medium.

The invention, in still another embodiment thereof, relates to a method of automatic identification comprising applying a multiple marking layer label onto a component. Each marking layer encodes a respective identification symbol. The respective identification symbol is detected from each marking layer.

It is an object of the present invention to provide an improved method and system of automatic identification using a multiple layer machine readable identification label.

It is another object of the present invention to provide a machine readable identification label encoding identification symbols that is not optically detectable.

It is yet another object of the present invention to provide a machine readable label encoding identification symbols which are detectable when covered by a subsequent coating such as an opaque layer.

It is still another object of the present invention to provide a method and system for reading the various identification symbols encoded in the marking layers which comprise a multiple layer machine readable identification label.

Further features and advantages of the present invention will be set forth in, or apparent from, the detailed description of preferred embodiments thereof which follows.

DETAILED DESCRIPTION OF THE INVENTION

Figure 1:
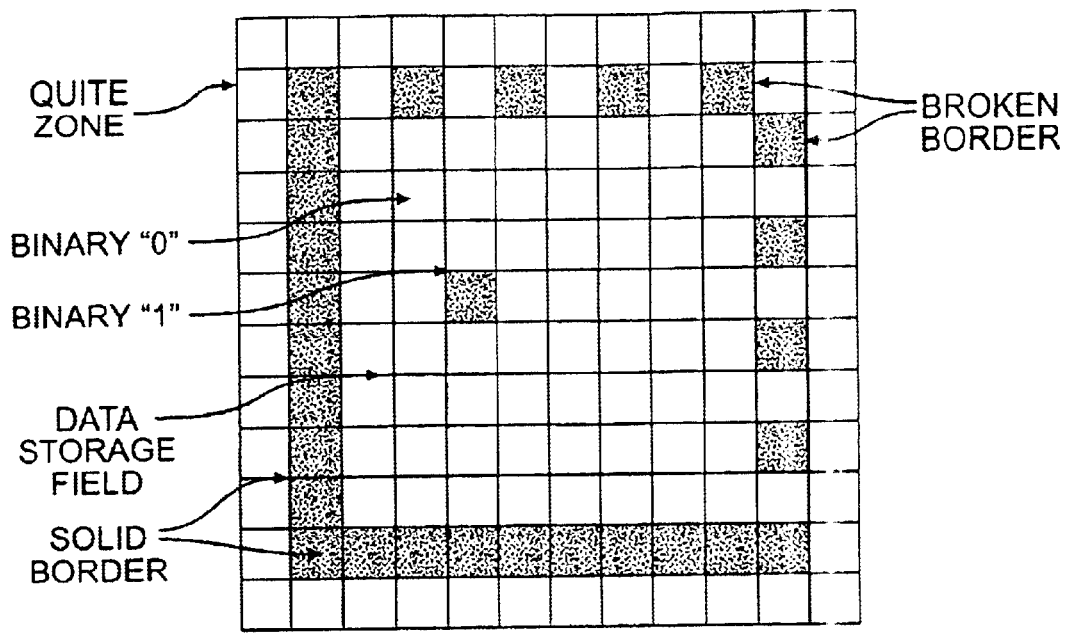
FIG. 1 illustrates the basic elements of a conventional matrix symbol in the prior art.
Figure 2:
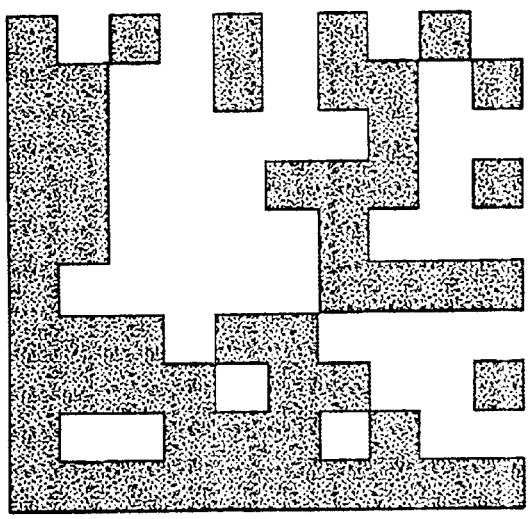
FIG. 2 illustrates the elements of a completed data matrix symbol known in the art.
Figure 3A:
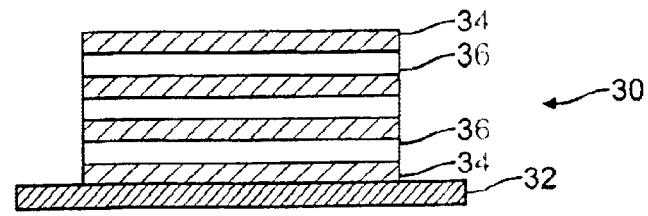
FIGS. 3(a)–3(d) are cross-sectional views illustratively depicting various multiple layer machine readable identification labels according to the present invention.

Referring now to FIG. 3(a), multiple layer machine readable label 30 is formed on substrate 32. Label 30 is formed of alternate marking layers 34 and neutral layers 36. The marking layers 34 encode identification symbols. As such, marking layers 34 are active layers with respect to sensing devices that will be used to detect the identification symbols formed therein. Optimally, marking layers 34 are of a constant thickness. The marking layers 34 are formed of the same material, thus making them sensitive to a single sensing technology.

The neutral marking layers 36 are inactive layers with respect to the sensing devices. Optimally, the neutral layers 36 are of a constant thickness. The neutral layers 36 provide a substrate for subsequent marking layers to be formed thereon. In addition, the neutral layers 36 enhance accuracy and efficiency of a sensing device with tomographic capability.

Figure 3B:
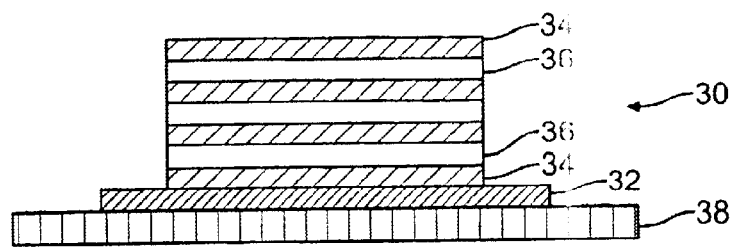
Figure 3C:
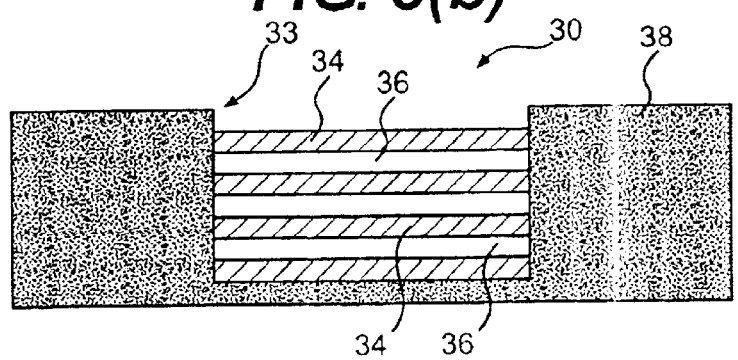

The substrate surface upon which multiple layer label 30 is formed may comprise the surface of a part or component to be marked. Alternatively, a complete multiple layer label 30 may be first formed on substrate 32 which is then bonded to the surface of part 38 (FIG. 3(b)). In an alternate form, rather than being formed on the surface of a substrate, multiple layer label 30 may be formed within a recess 33 of the surface of a part 38 (FIG. 3(c)).

Figure 3D:
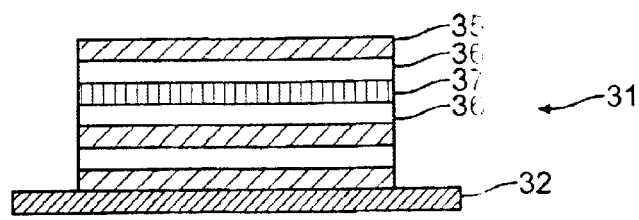

Referring now to FIG. 3(d), in another embodiment, multiple layer label 31 comprises a plurality of marking layers 35, 37, each composed of a different material. As such, marking layers 35, 37 have different characteristics, and thus sensitive to a different sensing technology. For example, marking layer 35 may comprises a magnetic detectable layer and marking layer 37 may comprise a x-ray detectable layer.

Figure 4:
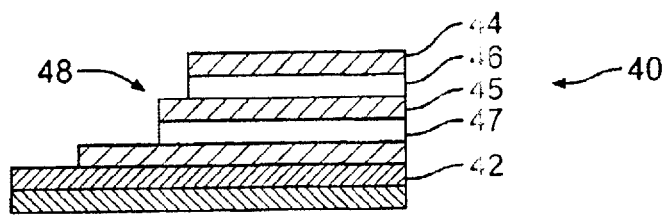
FIG. 4 is a cross-sectional view illustratively depicting a multiple layer machine readable label having offset layers according to the present invention.

In another, alternative form shown in FIG. 4, the multiple layer label 40 comprises layers offset (i.e., staggered) from one another on a substrate 42. Multiple layer label 40 comprises alternate marking layers 44 and neutral layer 46 formed offset from marking layer 45 and neutral layer 47 formed therebelow. As a result, edge 48 of marking surface 45 is exposed (i.e., not covered by neutral layer 46 or marking layer 44).

Figure 5:
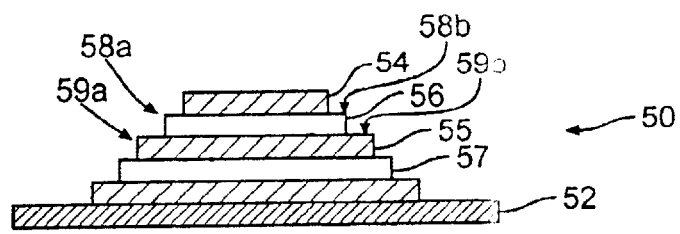
FIG. 5 is a cross-sectional view illustratively depicting another multiple layer machine readable label having an offset design according to the present invention.

Multiple layer label 50 represents an alternate offset design (FIG. 5) on a substrate 52. Each subsequent layer, of both marking layers 54 and 55 and neutral layers 56 and 57, is formed on a previous layer at an offset exposing both edges of the previous layer below. For example, marking layer 54 is formed on neutral layer 58 such that the edges 58a, 58b are exposed. Similarly, neutral layer 58 is formed on marking layer 55 such that edges 59a, 59b of marking layer 55 are exposed.

Figure 6:
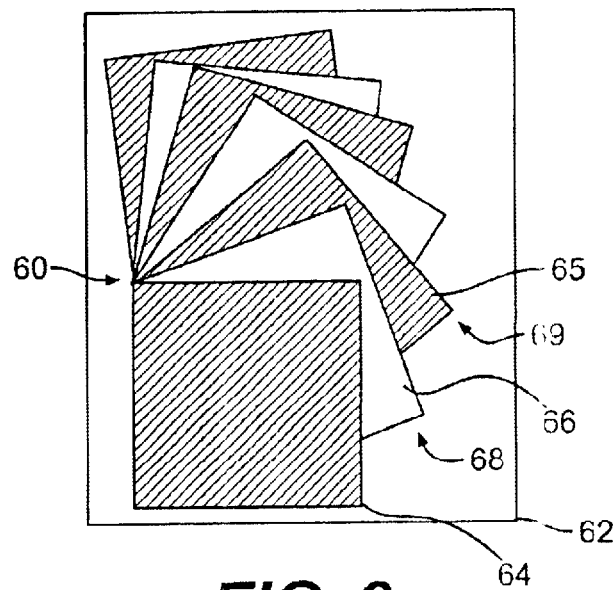
FIG. 6 is a top view illustratively depicting another offset design of a multiple layer machine readable label according to the present invention.

Referring now to FIG. 6, multiple layer identification label 60 represents yet another multiple layer label having offset layers disposed on a substrate 62. Shown as a top view, each subsequent layer is staggered relative to a layer below such that the edges are exposed. For example, marking layer 64 is formed on neutral layer 66 exposing edges 68 of neutral layer 66. Similarly, neutral layer 66 is formed on marking layer 65 exposing edges 69.

Exposing the edges of the various layers comprising the multiple layer identification label enhances tomographic efficiency. A sensor with tomographic capabilities can more easily differentiate the various marking layers comprising the multiple layer label with offset layers as the resulting staggered exposed edges provides enhanced delineation between the various layers comprising the multiple layer label.

Marking layers may be formed using any of a number of methods known in the art. One such method is additive marking depicted in FIG. 7. Marking medium 74 is applied to a layer of media of contrasting emissivity such as substrate 72. The marking medium 74 is deposited such that the layer formed thereby encodes an identification symbol to later be detected using one or more sensing technologies.

Substrate 72 may be the surface of a product or part to be labeled or may be a coating applied to the surface of a part. Any of a number of methods known in the art may be used to apply marking medium 74 so long as the methods do not adversely affect the properties or characteristics of marking medium 74.

Further, as is apparent to one of ordinary skill in the art, an appropriate marking method is selected based on the composition of substrate 72, marking medium 74 and detection method to read an identification symbol encoded therein. These methods include but are not limited to the use of ink jet, laser bonding, silkscreen, stencil, and thin film deposition.

Figure 8:
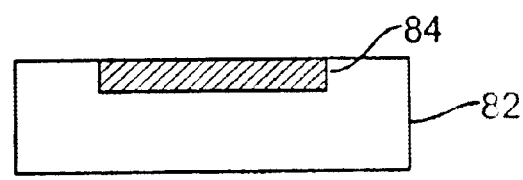
FIG. 8 is a cross-sectional view illustratively depicting direct marking of a marking layer according to the present invention.

Referring now to FIG. 8, marking 84 is produced by the technique of direct marking, also known as, intrusive marking. Direct marking forms a mark 84 by altering substrate surface 82 by abrading, cutting, burning, vaporization, or other similar destructive method to produce an area of contrasting characteristics or a recess that is subsequently back filled with a media of contrasting characteristics. Included in this method are dot peening, electrochemical etching, engraving, annealing, laser etching, laser induced surface improvement (LISI), and milling.

Figure 9:
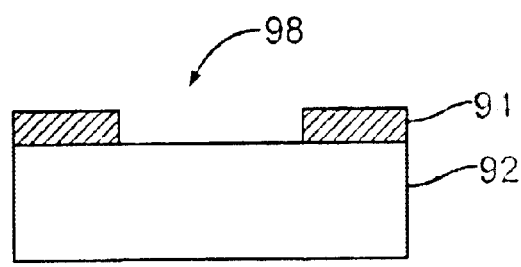
FIG. 9 is a cross-sectional view illustratively depicting subtractive marking according to the present invention.

Referring now to FIG. 9, marking medium 94 is produced by subtractive marking through a process used to apply a layer of marking medium that is subsequently removed in a selected area to expose a surface of substrate 92. Substrate 92 has a contrasting emissivity from that of marking medium 94. The technique of applying marking medium 94 to substrate 92 includes dipping, barrier and chemical conversion coating, planting and electro-planting, and vacuum controlled-atmosphere coating and surface modification processing. Portion 98 is selectively removed from deposited marking medium 94, for example, by a direct marking device known in the art, thereby encoding an identification symbol in marking layer 94.

Figure 7:
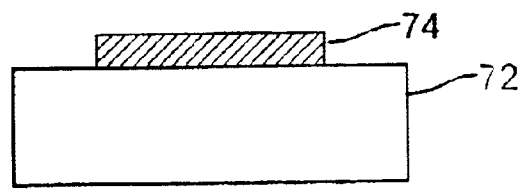
FIG. 7 is a cross-sectional view depicting the method of additive marking to form a marking layer according to the present invention.

The marking methods described with reference to FIGS. 7, 8 and 9 may be used on various metallic material substrates which include aluminum, copper and its alloys, nickel and its alloys, heat and corrosion resistant steels, tool steel, reactive and refractive metals, coated, plated and/or special condition metals, and non-metals such as polymetric materials, polymetric laminates, rubber, glass, and ceramics.

The neutral layers 36 may be applied in a similar manner as the marking layer 34 or may be an inherent part of the component (e.g., part or object) to be marked. For example, layers of a printed circuit board could be marked (i.e., a marking layer deposited or formed thereon) followed by multiple coats of paint or other protective layer applied over the entire printed circuit board including the symbol marking layer thereby forming a neutral layer. A subsequent symbol marking layer may then be formed on top of the previously laid multiple coats of paints or other protective coating prior to a subsequent multi-coating layer of paint or protective layer.

Figure 10A:
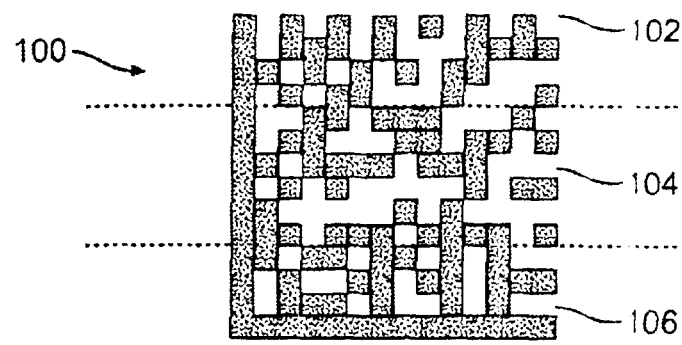
FIGS. 10(a)–10(c) illustratively depict a two-dimensional symbol divided into various symbol fragments.
Figure 10B:
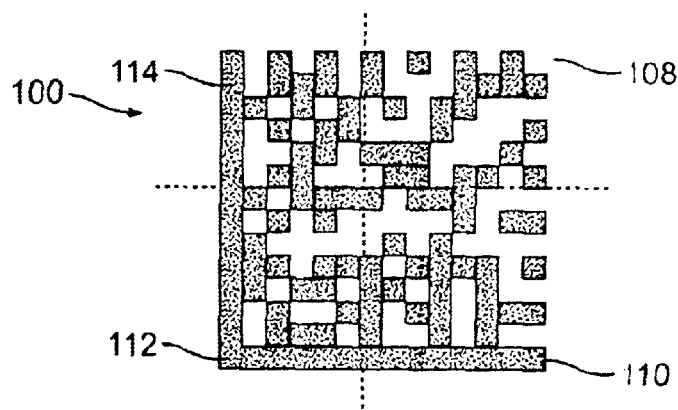
Figure 10C:
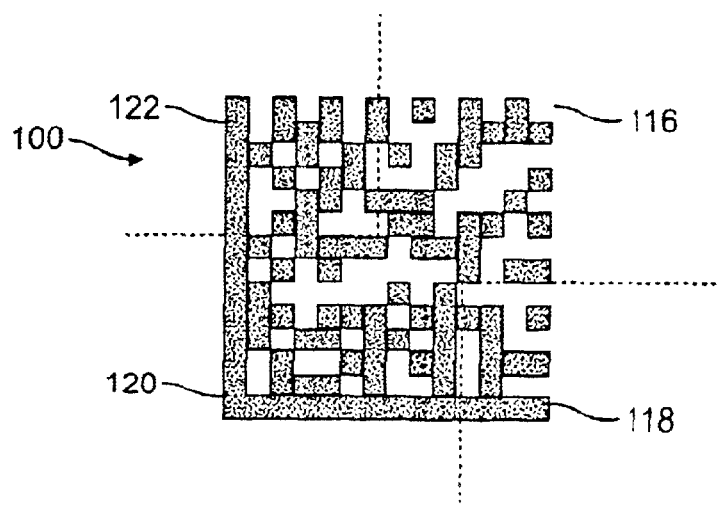

Referring now to FIGS. 10(*a*)–10(*c*), symbol 100 may be segmented in any of a number of logically divided patterns as indicated by broken lines producing symbol fragments such as symbol fragments 102, 104, 106 (FIG. 10(*a*)); 108, 110, 112, 114 (FIG. 10(*b*)); and symbol fragments 116, 118, 120 and 122 (FIG. 10(*c*)). The various symbol fragments which comprise symbol 100 may be encoded, divided, yet within a single marking layer, or may be encoded within different marking layers.

Symbols 100 that are segmented (i.e., fragmented) in a logical divided pattern and placed at different locations at the same marking layer or at different marking layers may be reconstructed using algorithms that rejoin data cell locators found at the boundaries at the symbol division. Data cell locators are designated cell groups that are assigned by the segmenting algorithm. They are adjoining at the segment boundaries and are involved in the encoded information in the symbol. The segmenting algorithm selects cell groups along the boundaries that will constitute a verifiable match when reconstructed. After the symbol is segmented, the reconstruction algorithm remembers the pattern and seeks to reunite the cell groups in the same positions in the array as when they were assigned as cell locators.

Figure 11:
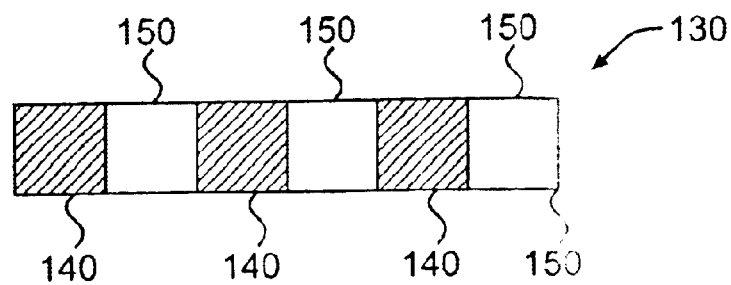
FIG. 11 illustratively depicts a tape medium for carrying a single image sensitive medium according to the present invention.

Referring now to FIG. 11, in an alternate marking method, tape medium 130 carries a single image sensitive medium 140 on the surface of tape medium 130 that will be placed in contact with a substrate surface to be marked. Tape medium 130 also carries neutral layer 150 on the same tape surface as medium 140. Neutral layer 150 contains a substance that does not interfere with the readability/detectability of the material of sensitive medium 140.

A heat transfer method, such as laser scribing a computer generated pattern, transfers an image from tape medium 130 onto a substrate to be marked thereby forming a marking layer which encodes an identification symbol.

To generate a multiple layer identification label using tape medium 130, tape medium 130 is indexed into position on a substrate layer at a target position such that image sensitive medium 130 is over the target position. A pattern of medium 140 is transferred from tape medium 130 to the substrate, forming a marking layer encoding a first identification symbol therein. Tape medium 130 is then indexed, positioning one of the neutral layers 150 over the first symbol. A neutral layer is formed over the first symbol by transferring neutral layer 150 from tape medium 130.

Tape medium 130 is then indexed such that another image medium 140 is over the previously transferred neutral layer. A second symbol is then marked on the previously transferred neutral layer. This process is repeated until a desired multiple layer label is complete. The various layers may be applied to a starting substrate which comprises a part to be labeled. Alternatively, a complete label may be formed first on a substrate material which is later bonded to the part to be labeled.

The symbols encoded may include a complete symbol or fragments thereof. For example, rather than encoding a complete symbol at each marking layer, a symbol layer may be divided into fragments. These fragments can then be encoded across multiple marking layers or spread out (i.e. divided) over the same marking layer. The symbol fragments are detected and reassembled through algorithms to form the completed symbol.

Figure 12:
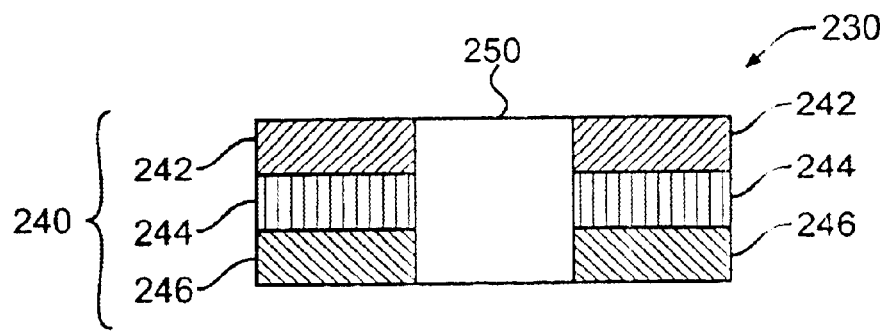
FIG. 12 illustratively depicts a tape medium for carrying multiple image sensitive materials according to the present invention.

Referring to FIG. 12, tape media 230 carries multiple image sensitive media 240 such as magnetic medium 242, x-ray medium 244, and radar medium 246. The multiple image sensitive media 240 and neutral layer 250 are applied to the surface of tape medium 230 which will come in contact with a substrate to be marked. The transfer method by which the various image sensitive media 240 and neutral layer 250 are transferred from tape medium 230 to the substrate to be marked is the same as the transfer method described above in reference to tape medium 130.

When forming a multiple layer identification label composed of multiple layers of different medium encoding a respective identification symbol, tape 230 is indexed into position on a substrate to be marked with one of the image sensitive media 240 over the target position on the substrate to be marked.

For example, a first symbol detectable by a magnetic detector, may be produced by indexing magnetic medium 242 over the target area. A first symbol is marked on the substrate by transferring a selected portion of the magnetic medium 242 to the substrate. Tape 230 is then indexed such that neutral layer 250 is over the first symbol marked. A neutral layer is then transferred from neutral layer 250 to the previously transferred first symbol.

Next, tape 230 is indexed such that one of the remaining sensitive medium 240 is over the previously transferred neutral layer. For example, x-ray medium 244 may be indexed into position over the previously laid neutral layer and a second symbol transferred onto the previously transferred neutral layer. This process is repeated until the necessary number of layers are formed. Tape medium 230 may be used to transfer a complete symbol or fragments thereof in different locations on a single marking layer or across different marking layers.

Figure 13:
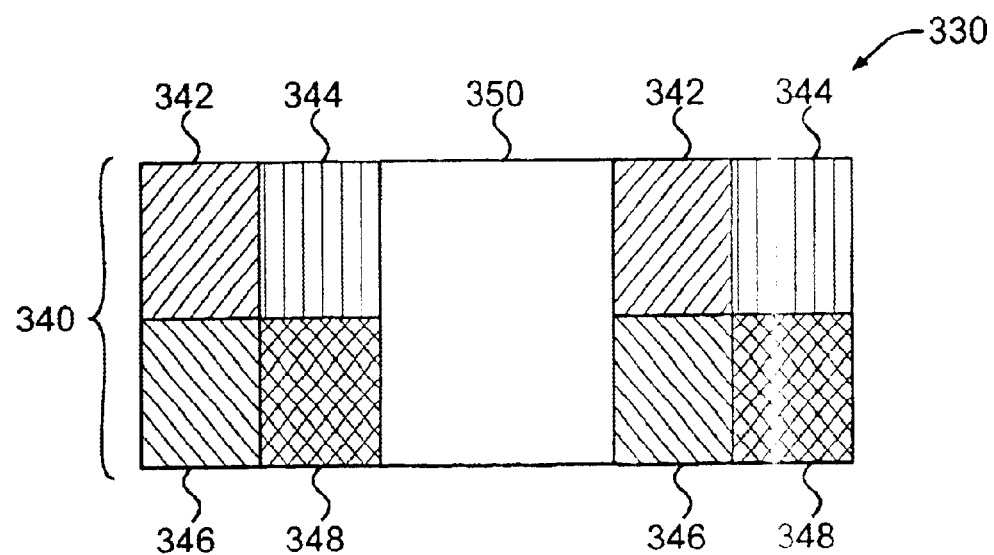
FIG. 13 illustratively depicts another tape medium for carrying multiple image sensitive media according to the present invention.

Referring now to FIG. 13, tape medium 330 may be used to carry multiple image sensitive media 340, with an intervening neutral layer 250. The media 3340 include a magnetic medium 342, x-ray medium 344, radar medium 346, and infrared medium 348 on the surface of tape medium 330 which will come into contact with a substrate to be marked. The transfer method by which imag sensitive media 340 is transferred to a substrate is the same as the method used with tape medium 230. The various image sensitive media 340 are indexed into position such that alternate image sensitive media 340 Is transferred forming an identifiable symbol to a substrate or previously deposited neutral layer until a desired multiple layer label is formed.

Figure 14:
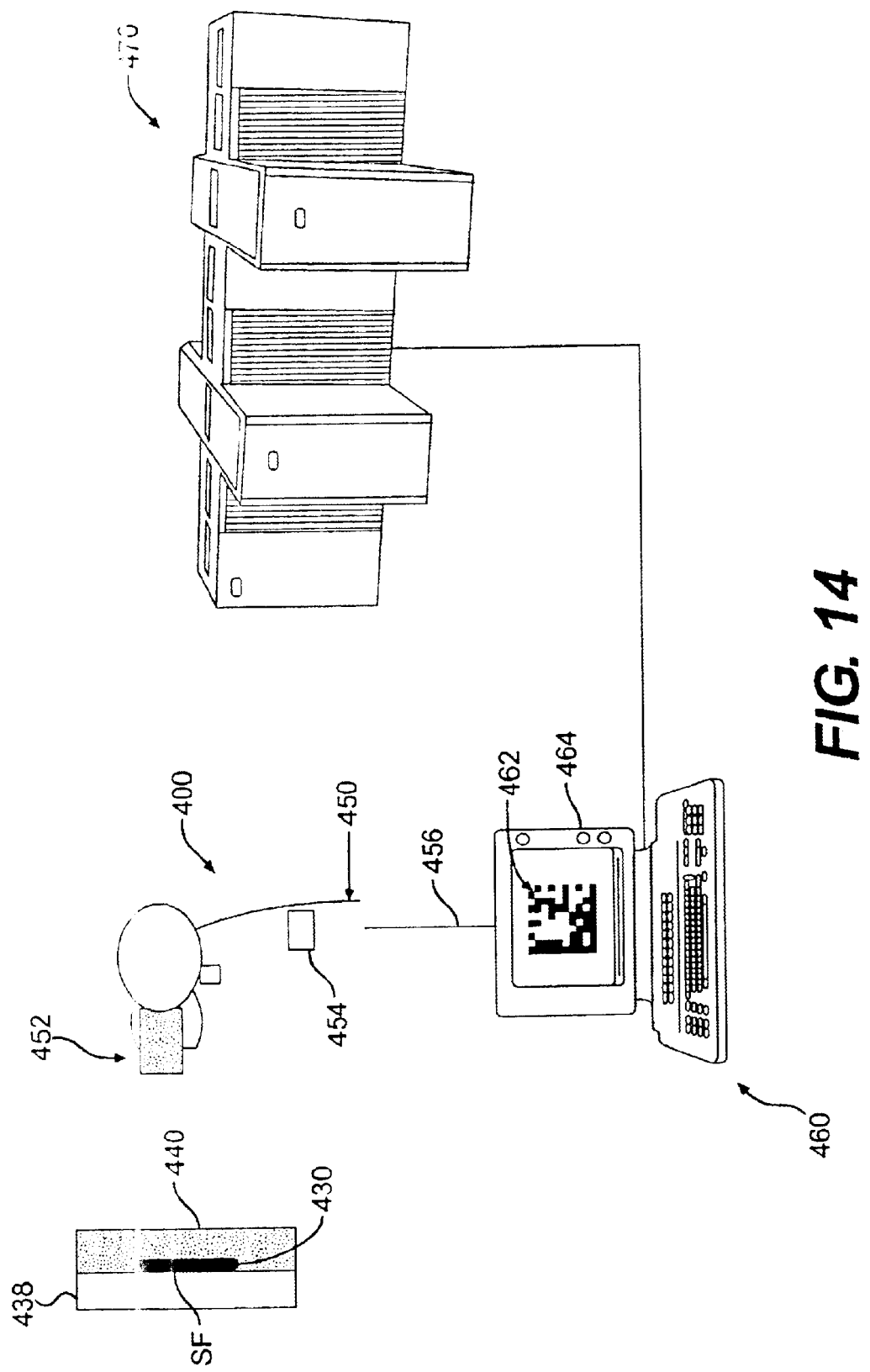
FIG. 14 illustratively depicts a system for automatic identification.

FIG. 14 illustratively depicts a system 400 for automatic identification of a multiple layer machine readable identification symbol 430. Multiple layer label 430 is applied to component 438 and covered with opaque layer 440. Detector 450 has sensor 452 for detecting the identification symbols encoded in the various layers which comprise label 430. In addition, detector 450 is connected to computer 460 which in turn is connected to host computer 470.

Sensor 452 has tomographic capabilities thereby detecting the various identification symbols encoded in the various layers which comprise multiple layer label 430. If multiple layer label 430 is composed of marking layers of the same medium, e.g. ultrasonic or x-ray detectable media, sensor 452 may incorporate a single sensor technology such as x-ray or ultrasonic (depending on the medium encoding the identification symbol to be detected). Both x-ray and ultrasonic sensing technologies have tomographic capabilities that permit detection of the respective identification symbols encoded in multiple layers of the same type of marking medium.

Sensor 452 receives analog image signals from multiple layer label 430. Detector 450 includes A/D converter 454 which outputs digital signal 456 to computer 460. Computer 460 can display each of the detected identification symbols such as identification symbol 462 on display 464. In addition, computer 460 can convert identification symbol 462 into an ASCII data string by correlating identification symbol 462 to its corresponding ASCII data string stored in host computer/server 470.

If multiple layer label 430 is composed of marking layers of different medium having different characteristics which encode the various identification symbols, detector 450 incorporates multiple sensors, each incorporating a different sensing technology. Each of the different sensors reads a respective identification symbol from one of the marking layers which compose the multiple layer label 420. For example, detector 450 may incorporate x-ray sensing technique to detect the identification symbol from a marking layer sensitive (i.e., response) to x-ray detection. Another marking layer sensitive to thermal can be detected by a thermal detecting sensor that is incorporated into detector 450. The various sensors which may be incorporated into detector 450, include but are not limited to, x-ray, radar, capacitance, thermal, magnetic, and ultrasonic sensor.

Although the invention has been described above in relation to preferred embodiments thereof, it will be understood by those skilled in the art that variations and modifications can be effected in these preferred embodiments without departing from the scope and spirit of the invention.

What is claimed is:

1. A machine readable multiple layer label to be read by a sensor, said label comprising:
    a plurality of machine readable marking layers stacked one upon another, each said marking layer encoding an identification symbol detectable using a sensor selected from the group consisting of capacitance, thermal and magnetic sensors, wherein said sensor comprises a thermal sensor and wherein one of said marking layers comprises a different medium having characteristics detectable by a sensor other than a thermal sensor.

2. The machine readable multiple layer label of claim 1, wherein said identification symbol comprises a two-dimensional symbol.

3. The machine readable multiple layer label of claim 2, wherein said two-dimensional symbol comprises a matrix forming an encoded array.

4. The machine readable multiple layer label of claim 1 further comprising an opaque layer disposed over said plurality of machine readable marking layers.

5. The machine readable multiple layer label of claim 1 further comprising at least one neutral layer disposed between two of said plurality of marking layers.

6. The machine readable multiple layer label of claim 1 further comprising a plurality of neutral layers, each of said neutral layers separating two of said plurality of marking layers.

7. The machine readable multiple layer label of claim 1 wherein said marking layers are stacked in an offset manner from one another.

8. An automatic identification system, said system comprising:
    a plurality of machine readable marking layers stacked one upon another, each of said marking layers encoding a respective identification symbol, each of said marking layers comprising a different medium having characteristics detectable by a different sensor; and
    sensor means for detecting said respective identification symbol of each of said marking layers, said sensor means comprising a radar sensor for detecting the identification symbol of a first marking layer and a further sensor for detecting the identification symbol of a second marking layer, said further sensor being selected from the group consisting of ultrasonic, x-ray, capacitance, thermal and magnetic sensors.

9. The system of claim 8, wherein at least one of said identification symbols comprises a two dimensional symbol.

10. The system of claim 9, wherein said two-dimensional symbol comprises a matrix forming an encoded array.

11. The system of claim 8, wherein
    said further sensor means comprises an x-ray sensor with tomographic capabilities for ready said respective identification symbol from each of said marking layers.

12. The system of claim 8, wherein said further sensor comprises a sensor of the group consisting of capacitance, thermal and magnetic sensors.

13. The system of claim 8 wherein said sensor comprises an x-ray sensor.

14. The system of claim 8, further comprising an opaque layer disposed over said plurality of machine readable layers.

15. The system of claim 8, further comprising at least one neutral layer disposed between two of said plurality of marking layers.

16. The system of claim 8, further comprising a plurality of neutral layers, each said neutral layers separating any two of said plurality of marking layers.

17. The system of claim 8, wherein identification symbols of at least two of said marking layers comprises a first symbol fragment and a second symbol fragment.

18. The system of claim 17 further comprising a processor for assembling said first symbol fragment and said second symbol fragment after detection thereof to thereby form a complete symbol.

19. A method of automatic identification, said method comprising the steps of:
   applying a multiple marking layer label onto a component, each marking layer encoding a respective identification symbol; and
   detecting the respective identification symbol from each marking layer using a sensor selected from the group consisting of capacitance, thermal and magnetic sensors,
   each marking layer comprising a material having different characteristics from that of the other marking layers, and the step of detecting the respective identification symbol comprises detecting the identification symbol of the first layer using thermal sensor and detecting the identification symbol of a further layer using a further, different sensor of said group.

20. The method of claim 19, wherein the identification symbol comprises a two-dimensional symbol.

21. The method of claim 19, wherein the two-dimensional symbol comprises a matrix forming an encoding array.

22. The method of claim 19, wherein, the step of detecting the respective identification symbol comprises using at least two different sensors, and the different sensors comprise two of the group consisting of x-ray, radar, capacitance, thermal, magnetic, and ultrasonic sensor.

23. The method of claim 19, further comprising applying an opaque layer over the label.

24. The method of claim 19, wherein the label further comprises a neutral layer disposed between two of the plurality of marking layers.

25. The method of claim 19, wherein the respective identification symbol encoded in at least two marking layers comprise a respective symbol fragment.

26. The method of claim 25, further comprising the step of assembling detected symbol fragments thereby forming a complete symbol.

27. The method of claim 19, wherein the step of detecting the respective identification symbol from each marking layer comprises the steps of:
   collecting analog image signals emitted from the label; and
   converting the analog image signals to a digital signal string using an analog to digital converter.

28. The method of claim 27, further comprising the step of converting the digital signal string into an ASCII data string.

29. The method of claim 28, further comprising the step of converting the ASCII data string to a video signal that can be displayed on a video monitor.

30. A machine readable multiple layer label to be read by a sensor, said label comprising:
   a plurality of machine readable marking layers stacked one upon another, each said marking layer encoding an identification symbol detectable using a sensor selected from the group consisting of capacitance, thermal and magnetic sensors wherein one of said marking layers comprises a different medium having characteristics detectable by a different sensor from the sensors of said group, said different sensor comprising a sensor of the group consisting of x-ray, radar, and ultrasonic sensors.

* * * * *